United States Patent [19]

Trovato et al.

[11] Patent Number: 5,663,879
[45] Date of Patent: Sep. 2, 1997

[54] METHOD AND APPARATUS FOR SMOOTH CONTROL OF A VEHICLE WITH AUTOMATIC RECOVERY FOR INTERFERENCE

[75] Inventors: Karen Irene Trovato, Putnam Valley, N.Y.; Leendert Dorst, Abcoude, Netherlands

[73] Assignee: North American Philips Corporation, New York, N.Y.

[21] Appl. No.: 966,221

[22] Filed: Oct. 26, 1992

Related U.S. Application Data

[63] Continuation-in-part of Ser. No. 879,702, May 5, 1992, abandoned, which is a continuation of Ser. No. 646,516, Jan. 25, 1991, abandoned, which is a continuation of Ser. No. 290,130, Dec. 23, 1988, abandoned, which is a continuation-in-part of Ser. No. 123,502, Nov. 20, 1987, abandoned, and a continuation-in-part of Ser. No. 166,599, Mar. 9, 1988, Pat. No. 4,949,277.

[51] Int. Cl.$^6$ .............................. G06G 7/78; G06F 17/00
[52] U.S. Cl. .............................. 701/2; 364/148; 364/152; 395/88; 395/90; 180/167; 180/168; 701/25
[58] Field of Search .................. 364/424.01, 424.02, 364/443, 444, 449, 148, 274.3, 275.3, 275.4, 275.2; 395/87, 88, 89, 90; 180/167, 168, 169; 340/935, 937; 318/567, 568.12, 587

[56] References Cited

U.S. PATENT DOCUMENTS

| | | | |
|---|---|---|---|
| 3,617,962 | 11/1971 | Kenneth | 335/151 |
| 4,481,568 | 11/1984 | Inaba et al. | 364/167 |
| 4,482,968 | 11/1984 | Inaba et al. | 364/513 |
| 4,525,784 | 6/1985 | Hamel et al. | 364/434 |
| 4,570,227 | 2/1986 | Tachi et al. | 364/444 |
| 4,626,995 | 12/1986 | Lofgren et al. | 364/424.02 |
| 4,700,302 | 10/1987 | Arakawa et al. | 364/424.02 |
| 4,700,306 | 10/1987 | Wallmander | 364/449 |
| 4,764,873 | 8/1988 | Libby | 364/461 |
| 4,779,203 | 10/1988 | McClure et al. | 364/424.02 |
| 4,796,189 | 1/1989 | Nakayama et al. | 364/449 |
| 4,817,000 | 3/1989 | Eberhardt | 364/443 |
| 4,846,297 | 7/1989 | Field et al. | 180/169 |
| 4,860,209 | 8/1989 | Sugimoto et al. | 364/424.02 |
| 4,875,172 | 10/1989 | Kanayama | 364/424.01 |
| 4,879,658 | 11/1989 | Takashima et al. | 364/449 |
| 4,939,651 | 7/1990 | Onishi | 364/424.02 |
| 5,083,256 | 1/1992 | Trovato et al. | 364/148 |
| 5,103,305 | 4/1992 | Watanabe | 358/105 |
| 5,154,248 | 10/1992 | Schwager et al. | 180/168 |
| 5,229,941 | 7/1993 | Hattori | 364/424.02 |
| 5,375,059 | 12/1994 | Kyrtsos et al. | 364/449 |

FOREIGN PATENT DOCUMENTS 0346538 12/1989 European Pat. Off..
2158965 11/1985 United Kingdom.

OTHER PUBLICATIONS

*PV682 User's Manual*, (Revision 8, Jul. 10, 1987) by Pacific Microcomputers, Inc.
*Memory System, CI–VME, Technical Manual*, (Rev. A.1, Version I), by Chrislin Industries (month and year are not available).
*Model 411 VME–VME Adaptor* (month and year are not available).
*User Manual for DT1401 Series*, (1986, 1987) by Data Translation, Inc. (month is not available).
*Introduction Image Processing Tab, MFW 3–87–5001*, (Dec. 1984) by N.V. Philips Gloeilampenfabrieken.
*Modern Control Systems*, pp. 379–392, (Addison–Wesley 3d ed. 1983) by R.C. Dorf (month is not available).

Primary Examiner—Kevin J. Teska
Assistant Examiner—Tan Nguyen
Attorney, Agent, or Firm—Anne E. Barschall

[57] ABSTRACT

In order to provide smooth control a vehicle control method includes concatenating like-kind direction arrows in a configuration space. In addition, a stopping criterion is used to change a control signal in time to achieve stopping at a desired setpoint. To improve error recovery, control signals are changed in response to an error exceeding a predetermined limit.

15 Claims, 11 Drawing Sheets

INDICATES RANGE OF ACCEPTABLE X,Y LOCATIONS

METHOD AND APPARATUS FOR SMOOTH CONTROL OF A VEHICLE WITH AUTOMATIC RECOVERY FOR INTERFERENCE

RELATED APPLICATIONS

The present application is a continuation-in-part of U.S. application Ser. No. 879,702 filed May 5, 1992, now abandoned which is a filewrapper continuation of U.S. application Ser. No. 646,516 filed Jan. 25, 1991 now abandoned, which was a filewrapper continuation of U.S. application Ser. No. 290,130 filed Dec. 23, 1988 now abandoned, which was a continuation-in-part of U.S. application Ser. No. 123,502 filed Nov. 20, 1987 now abandoned and of U.S. application Ser. No. 166,599 filed Mar. 9, 1988 U.S. Pat. No. 4,949,277. All of the parent applications are incorporated herein by reference.

BACKGROUND OF THE INVENTION

1. Field of the Invention

The invention relates to controlling the motion of an object and in particular to following a planned path.

2. Related Art

Many methods of control are known. These typically provide feedback from sensors to adjust the actuators in a controlled machine. A common method is called a PID (because it contains proportional, integration and derivative terms), such as on pages 379–392 in the reference of *Modern Control Systems* by Richard C. Doff, Addison-Wesley Publishing Company, Third Edition, 1983, where the actuator responds in proportion to the error between the sensed values or position and the desired values or position. A desired trajectory, typically described by an elementary motion and optionally including velocity and possibly acceleration is the sequence of desired task states for the device to follow. Elementary motions are usually those that can be expressed in simple mathematical terms. The expression is usually simple because the computation is repeated in a feedback loop. A more mathematically complex motion is also possible, but only if there is sufficient time in the feedback loop. Examples of simple motions are arcs or straight lines. While sensing, the calculation of the error in sensed parameters (or parameters derived from them) and generating the corrective action for the actuator is called servoing. The sensed parameters are typically whatever characteristics are being monitored such as the position, orientation, velocity, or acceleration. Some parameters can be derived. For example, velocity can be determined given two positions and knowing the elapsed time. Elapsed time is commonly available on real time clock chips on many microprocessors. The servo process usually has a setpoint which is a desired final destination often defined by a final location, orientation, and possibly velocity and orientation.

The maneuvers of a controlled vehicle, such as a car, are defined by the direction arrows in a configuration space. Ordinarily, a path is read out of the configuration space and then set points are sent to the vehicle. Although this works, improvements to the control is needed to produce a smoother motion which also allows for better automatic recovery from interferences.

SUMMARY OF THE INVENTION

The object of the invention is to provide such motion and recovery. This object is achieved using three embodiments of the invention.

In the first embodiment, direction arrows that point to subsequent direction arrows that are on the same fiber are concatenated so that any error can be smoothed over a longer motion. In the second embodiment, the orientation, location and time when the vehicle should be given a new setpoint is determined. In the third embodiment, it is determined whether the vehicle is on the desired path, and the motion is corrected if it is not.

BRIEF DESCRIPTION OF THE DRAWINGS

These and other aspects of the invention are described herein with reference to the selected embodiments illustrated in the following figures.

FIG. 1b shows the distribution of software used to control the hardware found in FIG. 1a.

FIG. 8a shows a farm tractor.

FIG. 8b shows earth moving equipment.

FIG. 8c shows a boat.

DESCRIPTION OF THE PREFERRED EMBODIMENT

The purpose of computing a path for a device (a vehicle in this case) is usually to have the vehicle be controlled to follow that path. Using a computed configuration space, there are at least two main methods to send control setpoints to a vehicle. A first method is to read out the complete path from the configuration space, and send all of the setpoints immediately to the vehicle. A second method is to continuously read out the current state of the vehicle, typically by using sensors, and sending new setpoints based on the sensed position. One problem with the first method (especially if the vehicle is a vehicle such as a car) is that if any error occurs in tracking (meaning movement underway along) the proposed path, then it is likely that it is impossible to track properly along the remainder of the path. A problem with the second method is that some choppy motion may result. This is particularly true when the sensed information (such as from a vision system delivered from a camera) places the location of the vehicle on the edge between two configuration states. In this situation, the noise (or discretization error) from the vision or sensing system may cause the perceived current state to switch between the adjacent states. Since the nature of the neighborhood of a vehicle is to have distant forward and reverse neighbors, with no sideways neighbors (unless the vehicle can move sideways), there is also the chance that the direction arrows from the adjacent states point in opposite directions. In the example where the vehicle parallel parks, this occurs much more frequently than when the vehicle is negotiating simple turns.

Figure 1A:
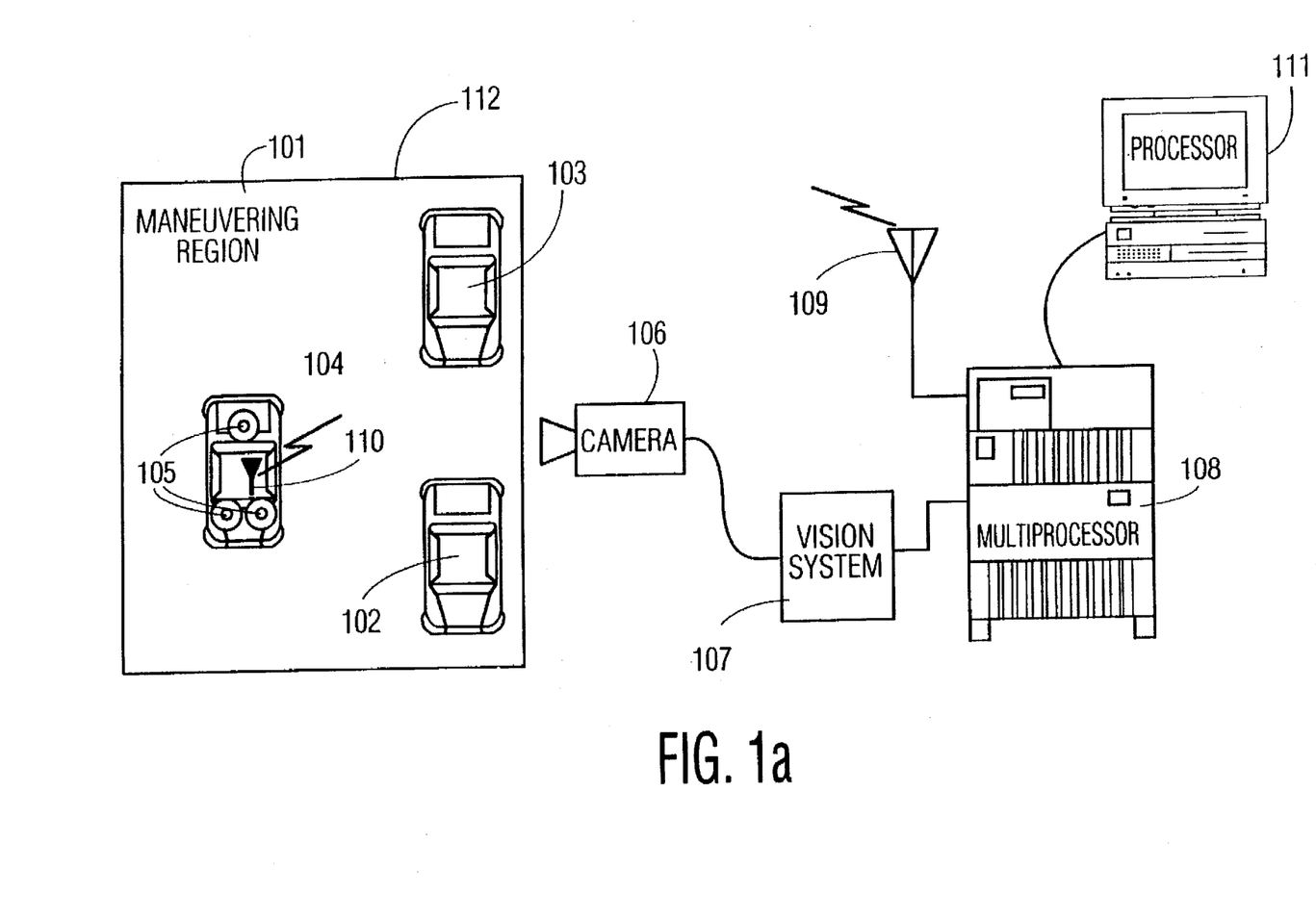
FIG. 1a shows the hardware layout of an implemented system.

FIG. 1a shows a system according to the invention. A maneuvering region 101 is surrounded by a wall 112. In typical operation there are obstacles in the maneuvering region such as parked cars 102,103 and such as the surrounding wall 112. A stock radio controlled vehicle 104 receives directives from a radio signal via an antenna 110 within the vehicle. These directives cause the front wheels to turn and rear wheels to drive forward or reverse. Tracking markers 105 are used to determine the direction and orientation of the vehicle. The markers are viewed by a camera 106 situated above the maneuvering region. The images are passed into a vision system (Philips Picture Acquisition and Processing System—PAPS version 2) system 107 which extracts the markers from the background image and computes the position and orientation of the vehicle. This information is then communicated to the multiprocessor 108. Based on the current position and orientation of the vehicle, a new directive for the vehicle's wheels is first converted from a digital value to an analog voltage (using an off the shelf D/A converter board residing on the multiprocessor bus) which is connected into the stock radio control transmitter. The transmitter sends the signal to the vehicle via its antenna 109. The final piece of hardware to be described is the processor 111 (a Sun-3 in this specific instance) that generates the configuration space that defines the proper maneuver. This machine is not in the control loop, and is simply used for starting and monitoring the machinery and for downloading the configuration space.

Figure 1B:
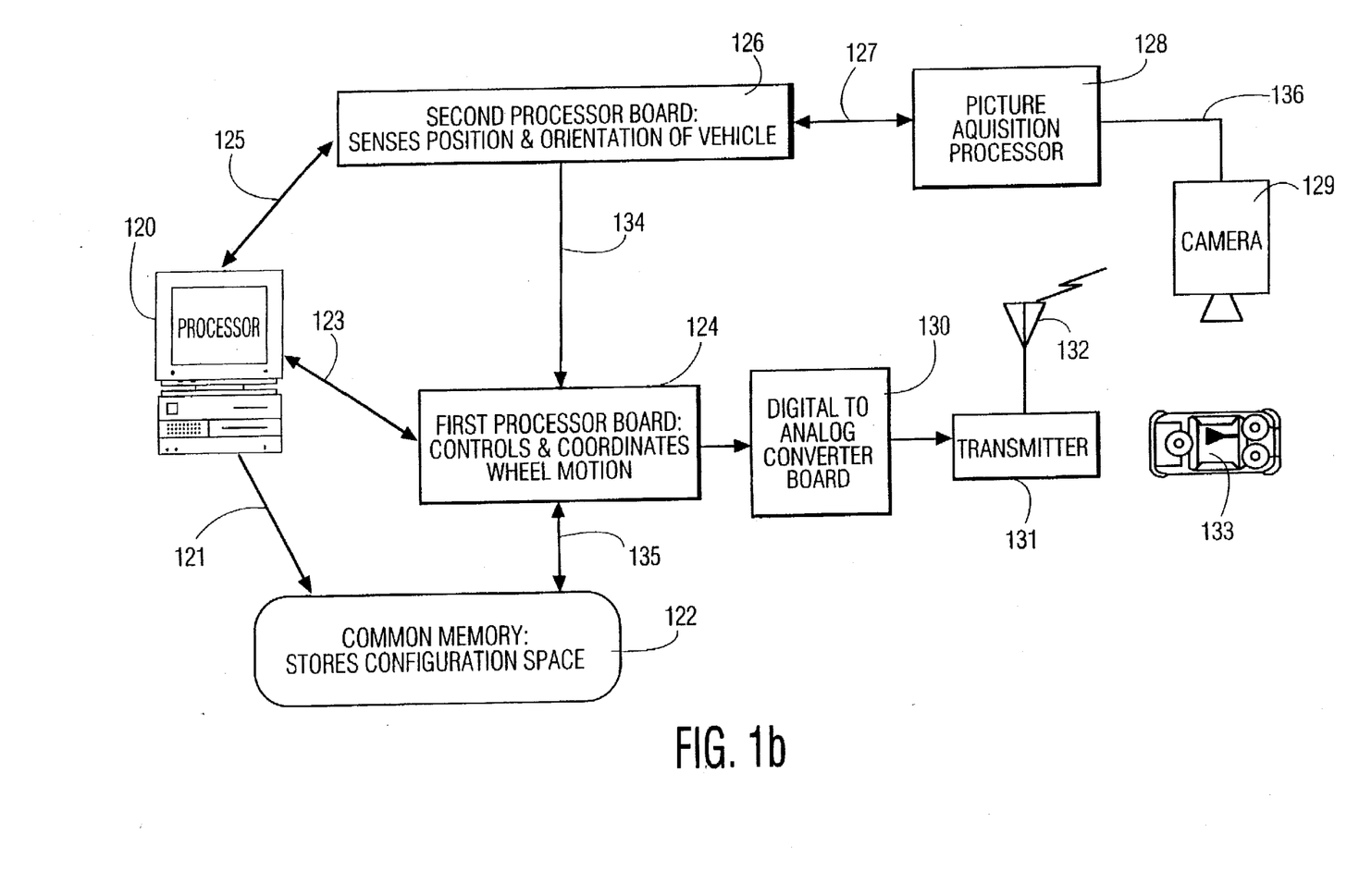

FIG. 1b describes how the system is started, and how activities are distributed among the two processors in the multiprocessor and information in common memory.

There are 4 steps that are repeated in a loop as long as the system is running.

The Sun 120 in the implementation first computes the configuration space based on where the obstacles are assumed to be. This information is provided via a graphical user interface. Although this information is only changed via the user interface in this implementation, an obvious extension is to read in obstacle information from a sensory system. The configuration space is then transferred (via a BIT-3 Computer Corp Model 400-202 VME to VME Bus Extender) 121 to common memory (Crislin Industries 4 megabyte Memory Board Rev. A Product#72259) 122.

The executable control code is then downloaded 123 from the Sun (model 3/160)120 to the First Processor Board 124. In this implementation, the processor board is a Pacific Microsystems PV682F which contains a Motorola 68020 and 1 megabyte of RAM. Once the download is completed, the process (program) starts to execute. The Digital to Analog Converter Board (Data Translation model DT5712-PGH) 130 is initialized to handle the scale and offset factors which will cause the proper voltages to go to the radio-controlled car's transmitter 131. The proper voltages are determined according to the particular transmitter to achieve forward and backward control of the wheels on a first channel, and a range of voltages which corresponds to a range of motion of the front wheels on a second channel. The transmitter 131 sends signals to the vehicle 133 via the antenna 132. The process determines locations in its own memory where sensed data is to be inserted. These memory locations are also called 'drop points'.

The First Processor Board 124 then directs the Sun 120 to download 125 the appropriate executable vision-control code to the Second Processor Board 126. This processor board is the same type of board as the First Processor Board 126. This directive includes the information to the vision-control code about the location of the drop points. Once the download is completed, the process starts to execute. It initializes the Picture Acquisition Processor 128 so that directives can be communicated 127. The Picture Acquisition Processor 128 is attached to the camera 129 via a coaxial cable 136. The system start-up is now complete and the processes running on the First Processor Board 124 and the Second Processor Board 126 are running in parallel.

The implemented system uses a vision system, although ultrasound, infra-red, Global Positioning System (GPS) or radar could also be used to determine position and orientation. Yet another sensing system could be one that measures distance travelled such as an odometer giving inferred position and orientation based on steering and distance. Still another is a Doppler device. The next section describes the interactions between the processes.

Figure 1C:
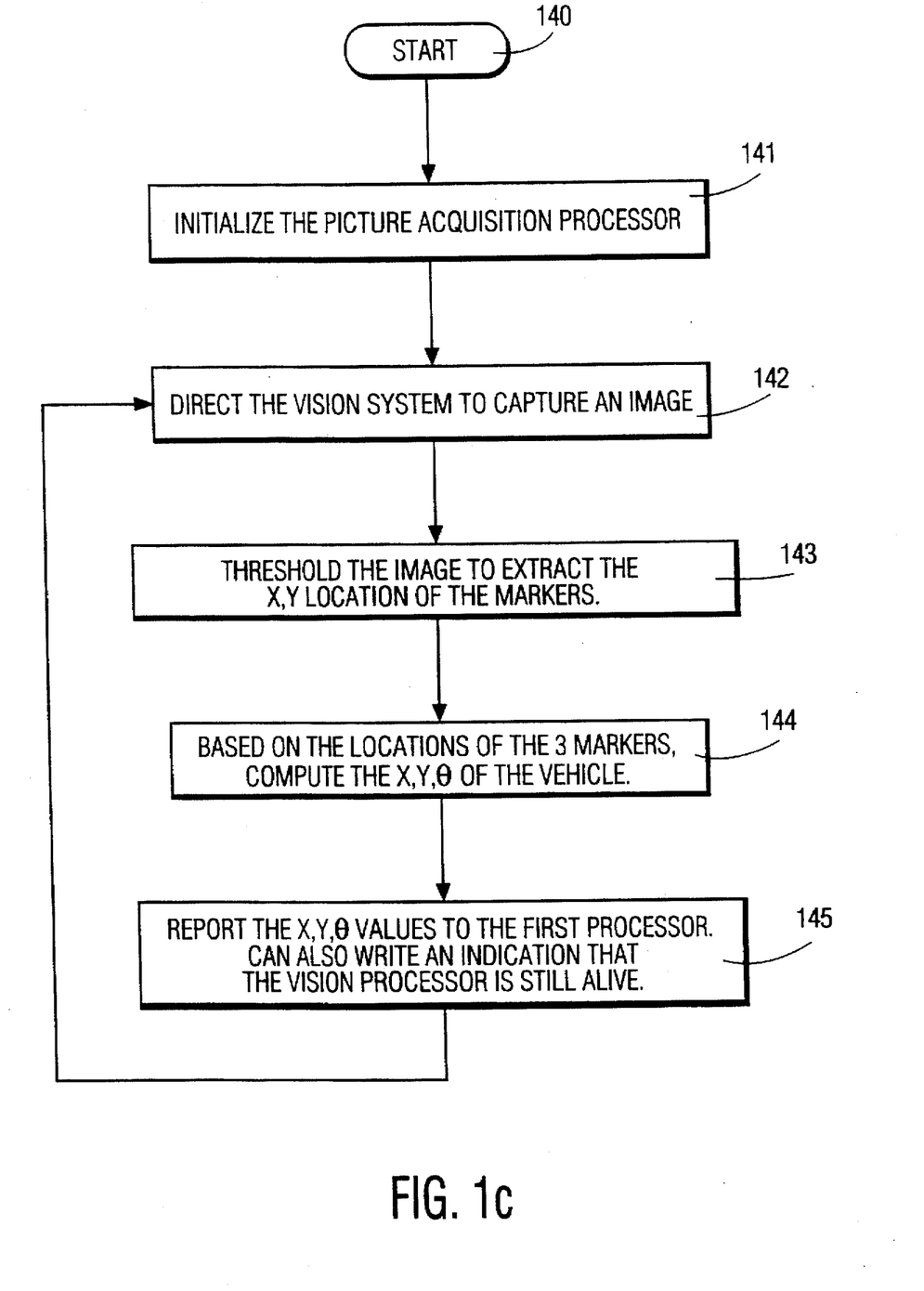
FIG. 1c shows the steps used in the sensing process on the Second Processor Board.

The transfer of the sensed position and orientation of the vehicle, along with the optional signal that the second processor is alive is indicated by the arrow 134. FIG. 1c describes the detailed steps for the second processor in the example implementation.

The First Processor Board 124 reads 135 the configuration state from configuration space from Common Memory 122 based on the position and orientation stored at the drop-points on the First Processor Board 124, and then repeatedly sends commands to the Digital to Analog Converter Board 130 which sets the Transmitter 131 to the proper voltages for drive and steering wheel settings. The Transmitter 131 communicates with the radio-controlled car through the antenna system 132. Servoing based on feedback from the vision (sensing) system that in turn causes changes in commands to the vehicle can be achieved in several ways, details of which are elaborated later in FIGS. 2a,2b,3a,3b, 4,5,6 and 7. A incremented flag, also referred to as an 'alive-indication', is used as a handshake to determine if the vision processor alive. In this embodiment, with every cycle of the servo process, the drop-point for the alive-indication is incremented. If the value exceeds a preset value, then the vehicle is directed to halt all wheel motion until the alive-indication is once again below the preset value. The purpose of this is to protect against a possibly failed sensing system.

Although an incremented flag is used in this embodiment, one skilled in the art could think of numerous handshaking methods including a measure of elapsed time.

The source code appendix is the code that runs in box 124. This code embodies the flowcharts of FIGS. 2b, 3a, 3b, and 6.

The second processor repeatedly senses the position and orientation of the vehicle as described in the steps of FIG. 1c.

In box 140 the vision process starts immediately after download from the Sun to the second processor is completed.

In box 141, the process initializes the picture acquisition processor (also referred to as the vision system).

Next, in box 142 the process directs the vision system to capture an image from the camera.

In box 143, the image is thresholded to determine the x,y pixel locations of the three markers on the vehicle.

In box 144, the shortest distance between two of the three markers is determined. This is a length crossing the narrow dimension of the body of the vehicle. Halfway between the two markers gives a point on the midline of the long dimension of the vehicle body. Based on knowing the position of the markers relative to the point midway between the rear wheels a-priori, the x,y location, also referred to as the 'crosshair' location is determined. The angle θ of the vehicle is determined by the angle that the third marker makes through the 'crosshair', relative to a predefined zero angle.

In box 145, the x,y,θ values are written directly into the drop-points of the first processor. As an extra measure of safety, an indication is also written in its own drop-point that the processor is alive. In the embodiment of FIG. 1b, the alive indication was setting the value at the drop-point to zero.

After the process in box 145 is completed, execution continues with the process in box 142. In normal operation, the processes in boxes 142,143,144, and 145 are repeated until the power is cut to the processor.

FIG. 1c describes the activities in each of the two processors and data in the common memory of the multiprocessor 108 of FIG. 1a. While there are other ways to distribute the activities and data in a multiprocessing environment, this was found to be a logical and efficient separation in the implemented system.

Methods to achieve a smooth motion while correcting for automatic recovery from interference are described below. The word stopping point and stopline are defined to mean the location or time in advance of the setpoint at which different control will cause the vehicle to safely achieve the prescribed setpoint. Examples of different control are braking, downshifting, and decelerating. In the case of a vehicle that can stop instantaneously, no advance different control is needed. Once the setpoint is successfully reached the sensed parameters are re-read, and the corresponding direction arrows (or alternatively concatenated direction arrows) are read to determine the next motion.

In practice, control methods to achieve smoother motion with a provision for error recovery should be used. To carry out the maneuver in a smooth robust fashion, three specific methods are described: a) the concatenation of neighbors on the same fiber, b) the use of a stopping criterion, and c) creation of an acceptable error region.

Figure 1D:
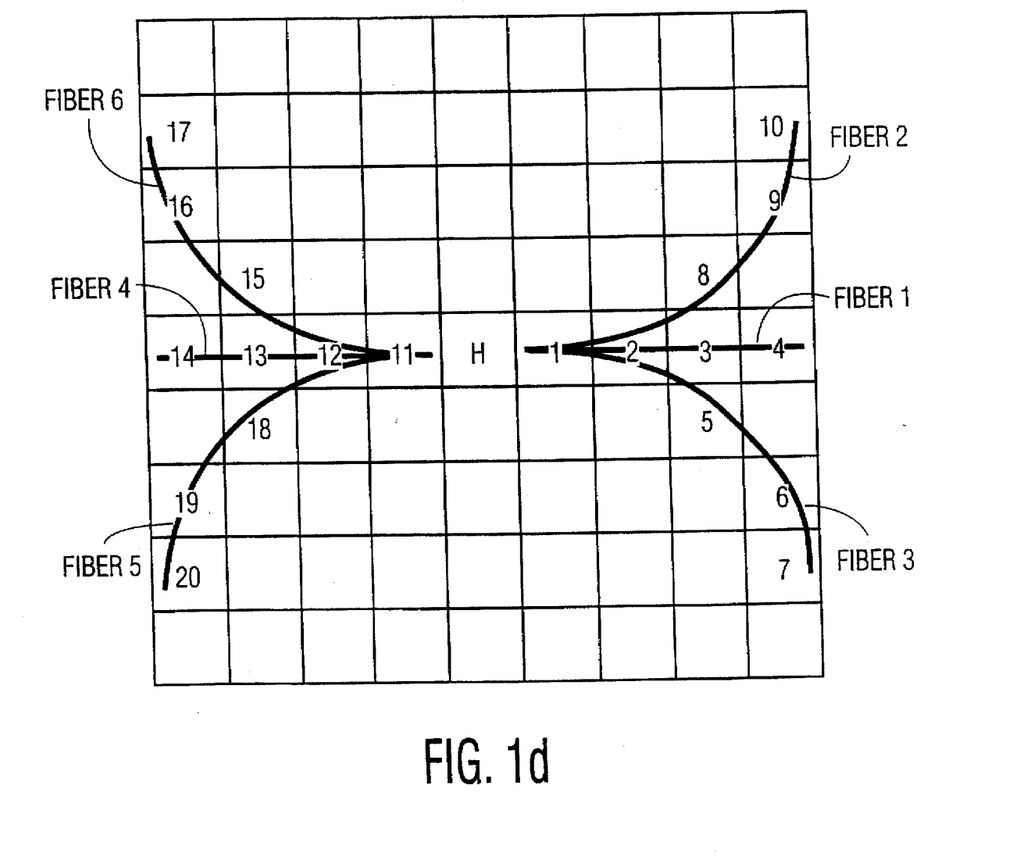
FIG. 1d shows an example neighborhood for a vehicle as it might be drawn on the ground from the center of the rear axle.
Figure 2A:
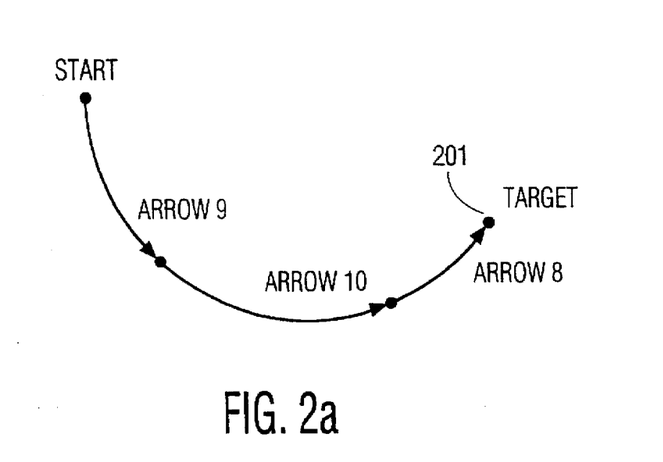
FIG. 2a shows the concatenation of three direction arrows on the same fiber (Fiber 2).

According to the first embodiment of the invention, smooth behavior can be achieved in the control of the vehicle if sequential, like-kind direction arrows are concatenated to specify a longer single motion. For example, the direction arrows corresponding to the fundamental motions of a vehicle are described as in FIG. 1d. The fundamental motions are steering hard-right, hard-left, and straight while moving either forward or reverse. This particular neighborhood as drawn is describing the motions as they are carried out. The neighbors are numbered 1 through 20, which reside on fibers 1 through 6 (shown in grey). In FIG. 2a for example, if part of the path to the goal were to require three sequential movements, i.e. to Neighbor 9, then to Neighbor 10, then to Neighbor 8, these movements all reside on the same fiber. Since motion described by this fiber implies servoing to the same curved arc, the direction arrows specifying motion to these neighbors are concatenated. The target 201, which is the final destination of the farthest concatenated neighbor, is then used as the setpoint. This farthest (terminating) neighbor is used as a target that can be most easily servoed to, which allows a smoothing of any position or orientation error over the entire fiber, rather than trying to correct for the error in each of the shorter spans defined by a single movement.

Figure 2B:
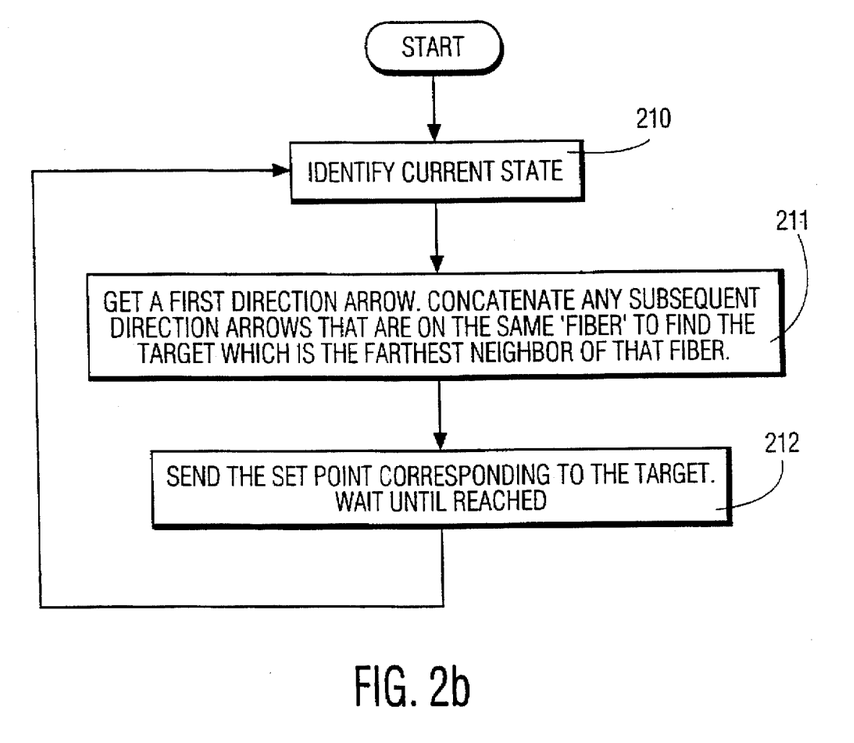
FIG. 2b is a flow diagram showing how concatenation is used in the control method.

FIG. 2b shows a flowchart describing how the concatenating method is used to control an actual vehicle to produce smooth motion. Box 210 identifies the current state. This can be determined directly by sensors, or by using other information known by the controller. For example, acceleration can be computed by knowing two velocities and the time elapsed.

Box 211 finds the direction arrow corresponding to the current state. By tracing the direction arrow to the subsequent state that it points to, the proposed subsequent direction arrow can also be read out. If the direction arrow and the proposed direction arrow reside on the same fiber, that is they would require the same servo control directive (i.e. servo to 45 degrees left and forward), then the target of the proposed direction arrow would be the better target. The direction arrows contained in each subsequent state are thus concatenated until a final state (also called a target) is reached where the neighbor contained therein is not on the same fiber. This final state is converted to the corresponding setpoint.

Box 212 sends the setpoint to the vehicle to be controlled. Servoing to the setpoint can be handled by numerous methods established in the prior art. Once the setpoint is reached, then control is passed back to box 210.

Figure 3A:
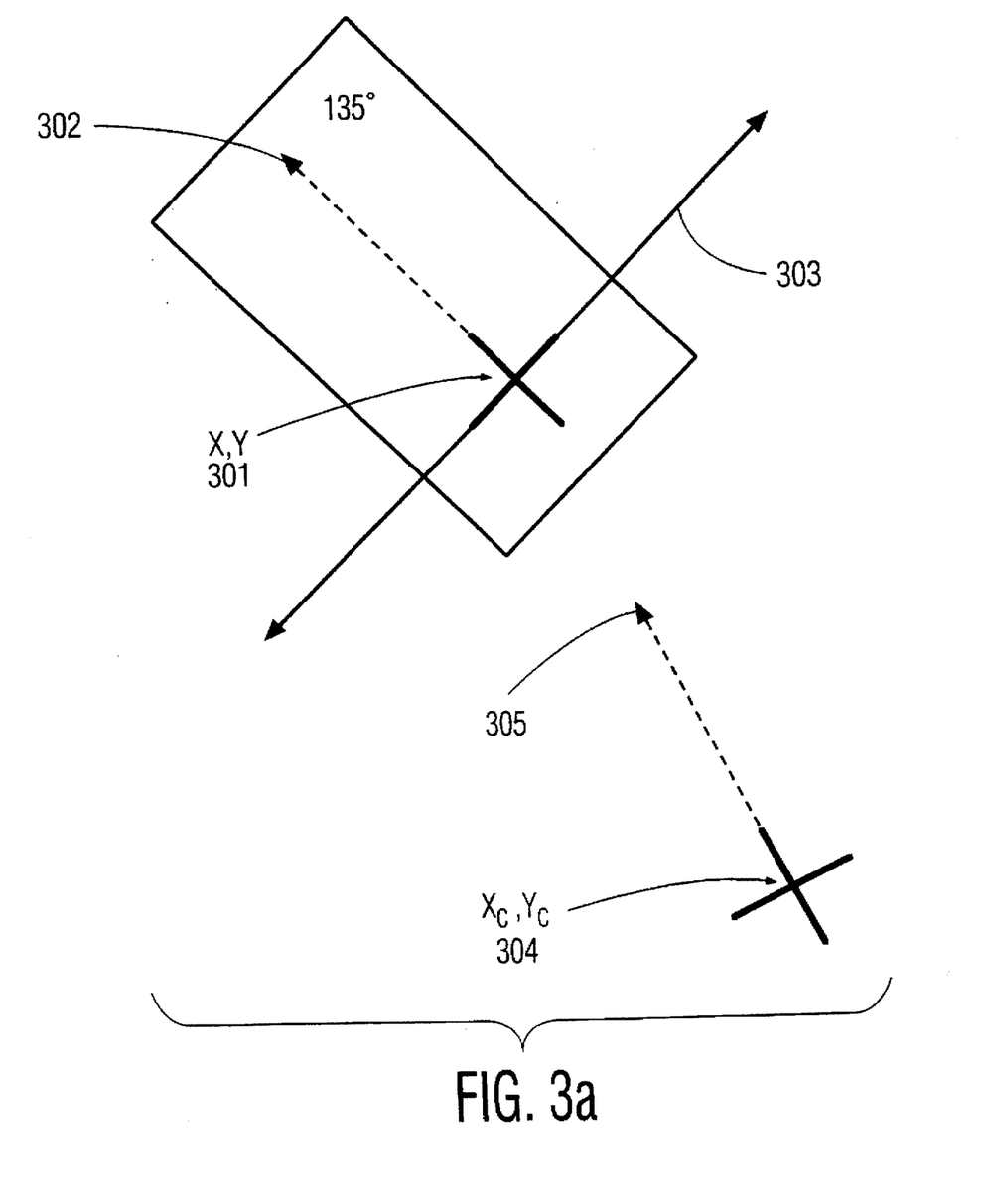
FIG. 3a shows a setpoint and the perpendicular stop line.

The vehicle can only achieve a smooth motion if a robust (in other words, error correcting) method to change control directions at the proper moment is provided for. According to the second embodiment of the invention, it is preferred determine the perpendicular to the orientation of the vehicle at the desired x,y setpoint, and then to read the direction arrows of the new state at the moment when the perpendicular is crossed. As in previous descriptions, the direction arrows prescribe the next desired motion. FIG. 3a shows the x,y setpoint 301 at a specific 135° orientation 302. The stopline is therefore the perpendicular to the 135° line, which is 45°, so that the line passes through the measured point 301. The stopline is a straight line going through the X,Y location at an angle 90 degrees off from the setpoint angle θ. By standard trigonometry, the formula for the line is of the general form y=mx+b where m is the slope of the line and b is the y intercept. The slope m is tan (θ+90) and the intercept is found by b=Y−tan(θ+90)*X. If the controlled vehicle is currently located at $X_c, Y_c$ 304 at angle $θ_c$ 305 then the current side of the stopline can be found by evaluating the formula: $Y_c−\tan(θ+90)*X_c−b$. The result will be positive on one side of the line and negative on the other. When the result changes, then the line has been crossed.

Figure 3B:
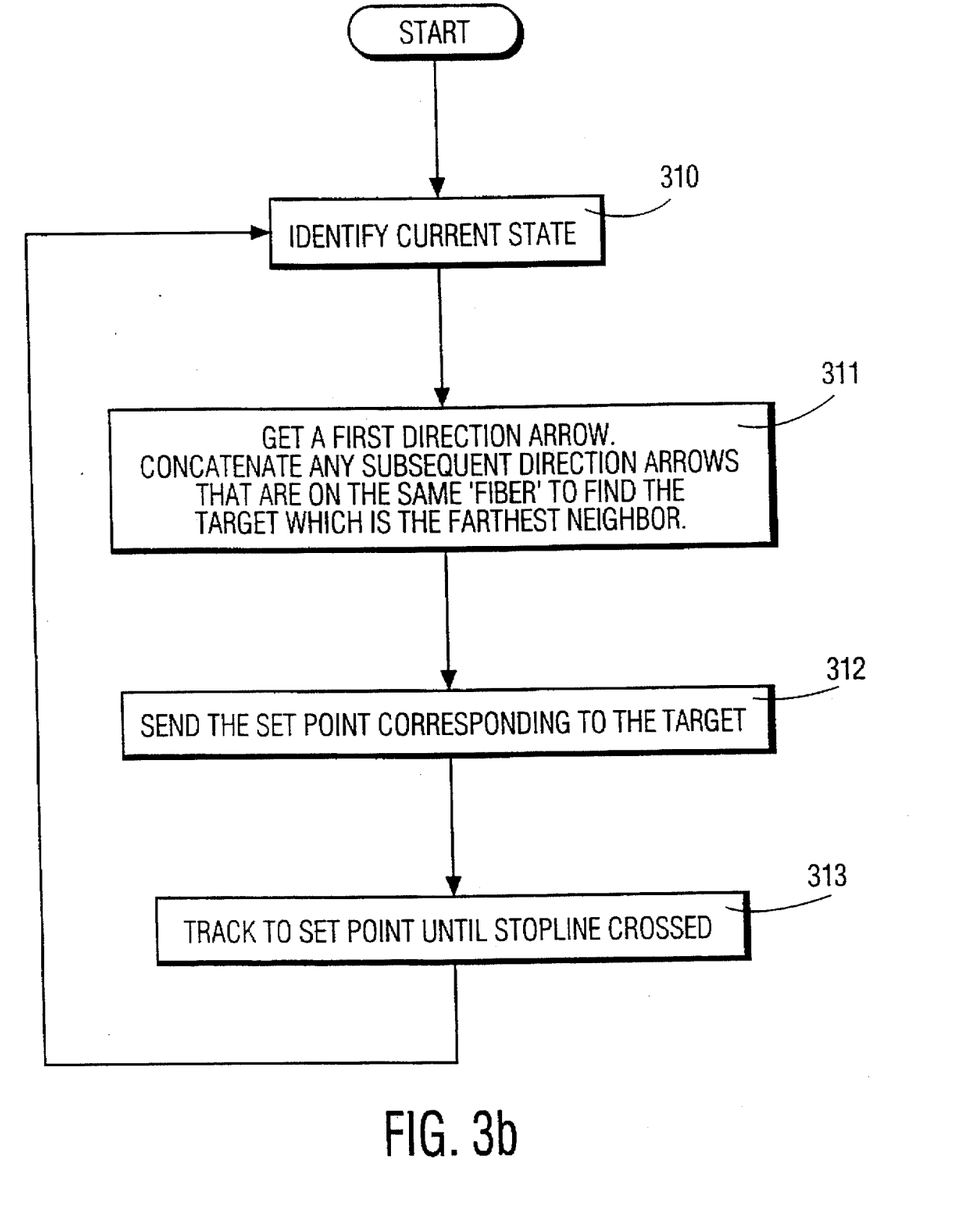
FIG. 3b shows a flowchart of how the stop line is used in controlling the vehicle.

FIG. 3b shows a flowchart describing how the use of a stop line is incorporated into the control so that both smooth motion and error recovery are achieved.

In box 310, the current state is found (same as box 210 in FIG. 2b).

In box 311, the target is found (same as box 211 in FIG. 2b).

In box 312, the setpoint corresponding to the target is sent to the vehicle (same as box 212 in FIG. 2b).

In box 313, the vehicle is controlled until the vehicle crosses the stopline. Crossing the stopline is determined when the point which is used to measure the state of the vehicle intersects or passes the stopline. An example of such a point is the midpoint between the rear wheels from which position and orientation is measured. Of course, other points can be chosen. The definition of the stop line can also be modified in such a way as to take into account the time and distance it takes to reach the stop line. For example, the command to begin braking must be issued before a vehicle is to achieve the setpoint and is based on the vehicles braking capacity, mass and current velocity. In this sense, there are two lines. The first is the stop line which is absolute, and is the indication of where the vehicle is presumed to have achieved the setpoint. The second is the command to stop line, which continually adapts to the current velocity, acceleration and other measures, and is positioned nearer the vehicle relative to the first stop line.

Once the stop line has been crossed, then control passes back to box 310 where the current state is read out. If the current state is not the target, then at this point a correction to the path will occur, causing a recovery from whatever error had occurred.

Figure 4:
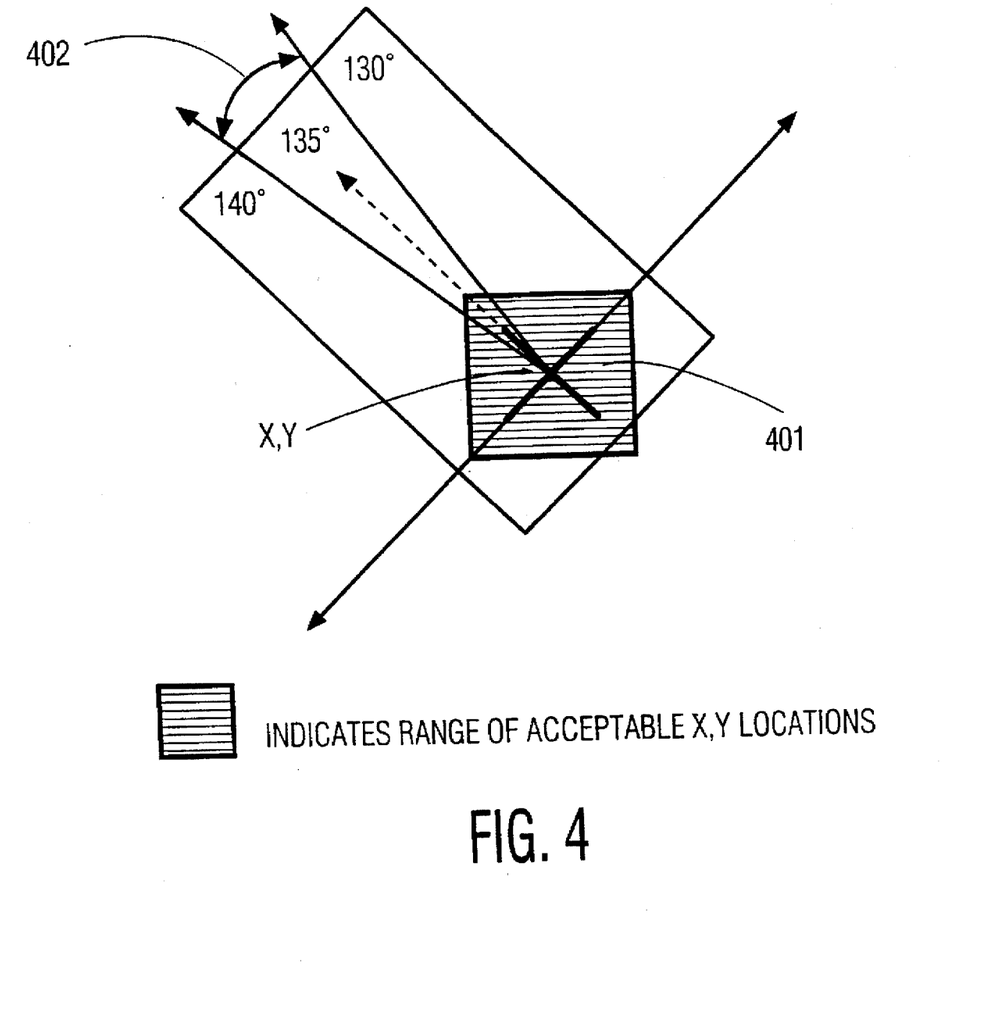
FIG. 4 shows the acceptable error region defining a legally achieved target.

In a third embodiment of the invention, another automatic recovery from interference with desired motion can be achieved. The ability to correct for mechanical error, modelling error, command transmission error and unplanned interruptions in the motion is a desirable feature. One way to implement automatic recovery is to set a specific limit on an amount of allowed error that is tolerable for each of the sensed parameters. In a vehicle, some of the sensed parameters are the three parameters x,y and angle. Other sensed parameters such as velocity, acceleration, and gravitational force could also be used to determine if the vehicle is on track. If the vehicle is not within the allowed error on the desired path, then the current state of the vehicle is sensed, and new direction arrows are obtained. Control resumes based on these new direction arrows. The error can either be checked as the vehicle proceeds to the target, or when the vehicle reaches the target, or both. Experiments have shown that in typical situations, the targets are not very far apart, and the best results are obtained by checking error only once the target is reached. FIG. 4 shows an example range of allowable error in the x and y dimensions 401, and an example range of allowable error in the orientation 402.

Figure 5:
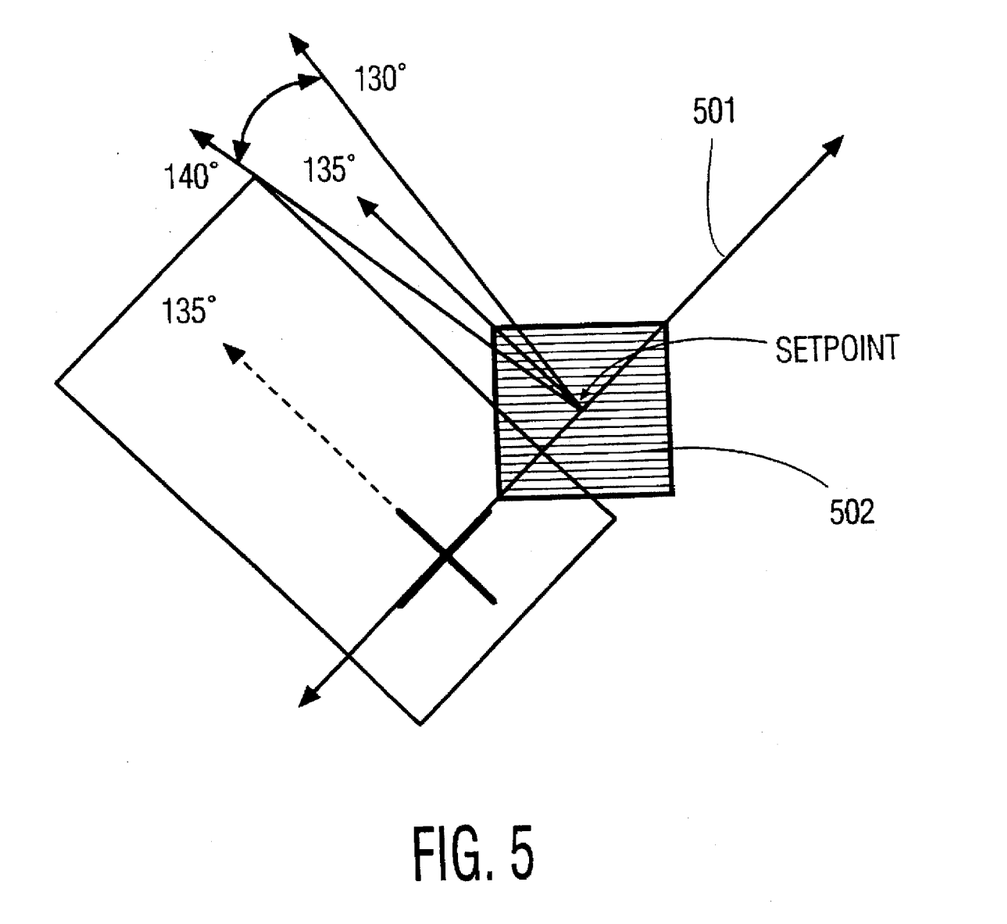
FIG. 5 shows a vehicle which has crossed the stop line, but which has not arrived within the legal limits of the target.

FIG. 5 shows an example of the vehicle reaching the stop line 501 within the error range for orientation, but not within the acceptable X or Y range 502. In this situation, the vehicle is so significantly off track that the original maneuver plan should be aborted, and a new set of direction arrows should be read from the configuration space based on the current sensed position. This method allows the vehicle to recover when errors occur. Most typically, these errors are deviations from expected or specified capabilities of the vehicle, unexpected and unmodelled terrain (mud for example), or operator intervention. Operator intervention may be used for example for the temporary manual over-ride of the vehicle control. Once automatic control resumes the vehicle is likely off the prior course. If error is being checked as the vehicle proceeds, the controller will adjust to a new course automatically.

Figure 6:
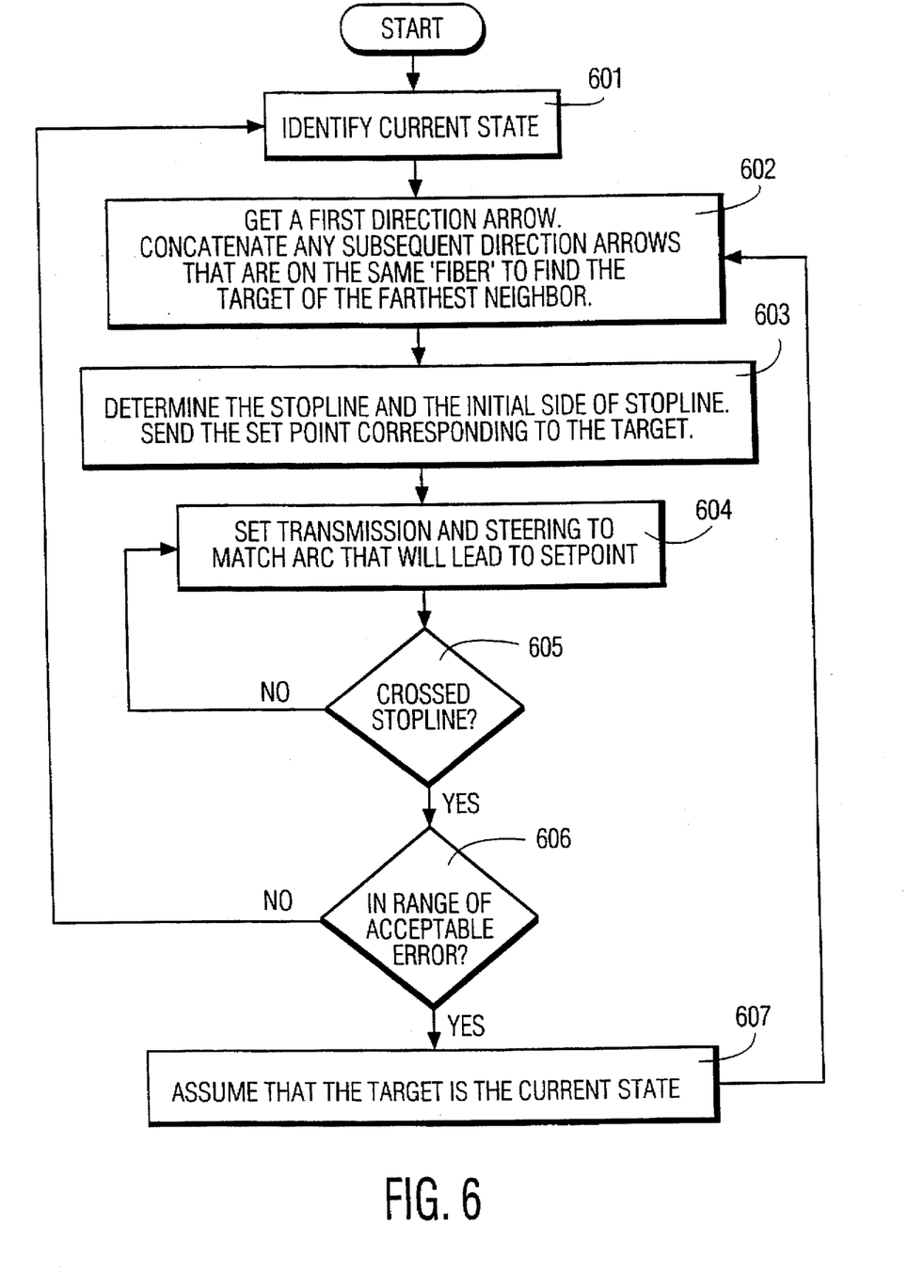
FIG. 6 shows a flowchart describing the test when the vehicle crosses the stop line

FIG. 6 shows a flowchart describing how the in-range test can be used

In box 601, the current state is found (same as boxes 210 and 310 in FIGS. 2b and 3b respectively).

In box 602, the target is found (same as boxes 211 and 311 in FIGS. 2b and 3b respectively).

In box 603, the stopline and initial side of the stopline is determined. For example, the stopline may be y=⅔+7, and control may start out on the negative side of the stopline. In a later step, if the vehicle moves to the positive side of the stopline, then the line has been crossed. The setpoint corresponding to the target is sent to the vehicle In box 604, based on sensory information which pinpoints the current monitored (sensed) parameters, the transmission direction (i.e. forward or reverse) and the steering position are set so the vehicle tracks along an arc (or straight line) which will run eventually through the setpoint.

In box 605, a check is made to see if the stopline is crossed. If it has not, then the 'NO' branch is followed back to box 604 where the transmission and steering are updated. If the stopline has been crossed, then the 'YES' branch is followed to box 606.

In box 606, an evaluation is made if the current position (or optionally any combination of sensed parameters such as orientation, velocity and acceleration) is within the bounds set which determine if the vehicle has reached the desired target. If the all errors are acceptable, then control passes to box 607 where the target is assumed to be reached. In box 606, if the current position is not within the acceptable bounds, then control passes to box 601, where the current state is re-established.

From Box 607, control is passed to box 602.

Figure 7:
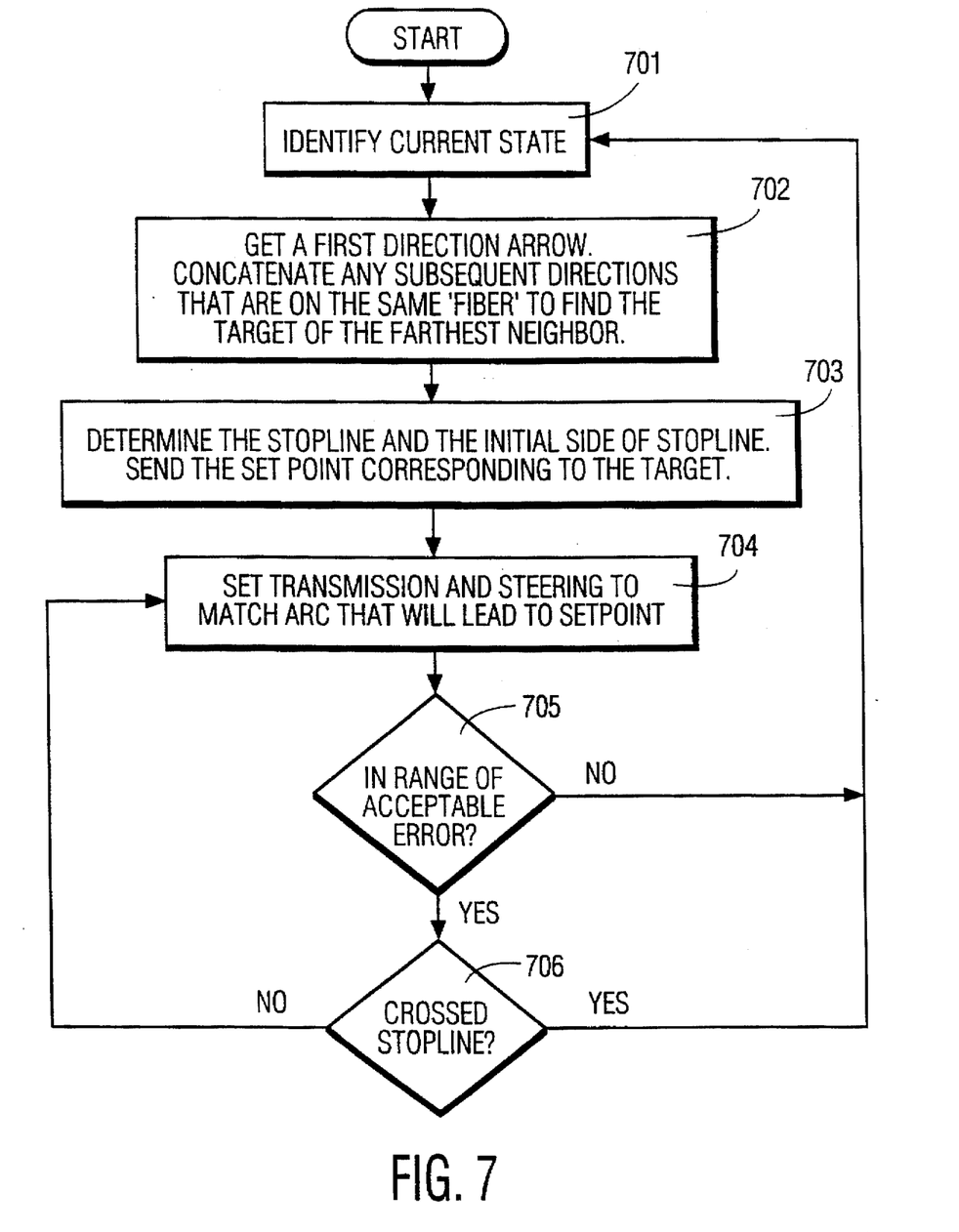
FIG. 7 shows a flowchart describing the continual testing of the vehicles proper tracking to the setpoint while the vehicle is en-route.

FIG. 7 shows the flowchart describing how control is achieved using the on-track test performed while the vehicle is en-route. The main difference between this method and the one in FIG. 6 is that the acceptable error is tested in the control loop, and no assumption about the final state is made.

Box 701 directly corresponds to Box 601 in FIG. 6.

Box 702 directly corresponds to Box 602 in FIG. 6.

Box 703 directly corresponds to Box 603 in FIG. 6.

Box 704 directly corresponds to Box 604 in FIG. 6.

Once the setpoint corresponding to the target has been sent to the vehicle, the vehicle begins to move. In box 705, while the movement is underway, the sensors and other computations are used to compute the moment to moment status of the vehicle. A defined range of error, which can be either pre-defined (for example, a fixed distance or angle), or computed internally (such as elapsed time, or computed velocity) is used to compare against the current status. If the error is out of range, then the current motion is aborted, and the current state is obtained in box 701.

The error range is repeatedly checked in box 705, and if the current status is acceptable, then in box 606, an additional check can be made to see if the stop line has been crossed. If it hasn't, then control returns to box 704, otherwise the destination has been reached, and the control returns to box 701.

Alternate Methods

The sensors in the above described embodiment are located above the vehicle. This is useful in a constrained environment such as a factory where affixing sensors off the vehicle is feasible. This lightens the load for the vehicle and gives a very stable frame of reference. Where this is not possible, such as on excavation or farm vehicles, the position and orientation sensors should be located on the vehicle.

Although the system as described has the computing away from the vehicle, the components and hardware can be distributed either on the vehicle, or away from the vehicle, as long as the communication between components is maintained.

The vehicle in the above described embodiment is a standard car-type vehicle, that is, it has two steering wheels in the front and two drive wheels in the rear. Whatever combination of drive and steering methods may be present can be controlled using the described methods. At least one driving method and one steering method must be present on the vehicle. The steering and drive methods may physically reside together such as on an outboard motor on a boat.

Stopping criteria other than the perpendicular stop line approach are also useful. Experiments have shown that in typical situations the best mode for finding the proper moment to issue a new setpoint while performing general maneuvers is the use of a stop line. However, depending upon the application, it may be more critical that one of the sensed parameters is exact while the others may be less exact. This is the case for instance when the vehicle is parallel parking, and the final motion to the goal is underway. It may be less critical that the vehicle is precisely 1 foot away from the curb, but very critical that the angle of the vehicle is perfectly parallel with the curb, 0 degrees for example. In this case, the stopping criteria for the controller is when the vehicle achieves 0 degrees, even if the vehicle is 1.1 feet or 0.9 feet from the curb. Once 0 degrees is achieved, then fixed control with straight wheels is employed to reach the stop line. If this special docking technique is not employed, then it is likely that the vehicle will repeatedly readjust itself trying to achieve the final perfect position.

Yet a different stopping criterion is one where a range in each of the variables forms a region which is considered to be acceptable for reading the next setpoint. This produces a bounding box within which a determination for the next control directive is issued. This criterion has the drawback that if the vehicle encounters drastic interference, such as operator over-ride, then it may happen that the vehicle never reaches the bounded box. This is a potentially dangerous situation since the vehicle would never reach the setpoint, and may continue to try servoing to an unreachable setpoint. That is, it would not re-evaluate the current position to see that it is on track.

A still different stopping criterion is one where the vehicle or vehicle continues to servo while the distance in configuration space is decreasing. Once the distance begins to increase, then the vehicle has achieved the setpoint. The main problem with this method is that the angular distance in configuration space may be small, but the maneuver required to reach that configuration requires many zig-zag motions which seem to increase the distance in x,y while decreasing the angular error. This stopping criterion would work best for a bulldozer type of a vehicle rather than a car type of vehicle, since the bulldozer tends to move in a straight line. One example where the car is not well controlled based on this criterion is if the car must make three fourths of a revolution. In this case the distance of the center of the rear axle actually increases before it decreases as the car proceeds to the setpoint.

Another stopping criterion is one where the distance travelled is measured. The vehicle will achieve the setpoint when the distance travelled matches the distance to the setpoint (as measured along the prescribed arc). This has the disadvantage that an unrecognized error may accumulate, leaving the vehicle in unpredictable locations. The advantage is that at low speeds (defined as speeds with very accurate control) for maneuvers such as parallel parking, a single, inexpensive sensing device may be used to achieve the goal with tolerable accuracy.

A specific technique to check that the vehicle or vehicle is on track (and to automatically recover if it is not) is to continually test that the current position leads to a setpoint using the current kinematic motion. For example, by using standard control methods, the vehicle can reach the setpoint by servoing to the setpoint by generating a kinematically feasible motion such as a curve and tracking along it. Sometimes unexpected or external causes force the vehicle sufficiently off course that it is no longer possible to stay the course as defined by the original curve. In this case, the controller can determine that no kinematically feasible arc exists between the current position and orientation (position and orientation defining a current state in configuration space) and the setpoint. This can be determined for example, by calculating the curve required to move between the current position and orientation and the final setpoint, and then finding if this curve is within the limits of the vehicles turning radius. If it is not, then the vehicle cannot successfully servo to the setpoint, and must resume control from the current state in configuration space (i.e. reading direction arrows and servoing to the new like-kind concatenated setpoint). This allows for robust recovery from catastrophic interference such as high winds, slippery surfaces, or impacts.

We claim:

1. A method of controlling a vehicle comprising the steps of starting from a stored configuration space representation of an environment of the vehicle, which stored configuration space representation includes a plurality of stored direction arrows defining paths to a goal, which direction arrows are selected from a neighborhood of direction arrows in which some arrows of the neighborhood are of like-kind with each other and some arrows of the neighborhood are of different kind;

concatenating a plurality of like-kind direction arrows in the configuration space to specify a single motion, which is longer than individual motions specified by any of the concatenated like-kind direction arrows, to pose corresponding to a target setpoint; and controlling the vehicle to reach the pose corresponding to the target setpoint, without separately specifying the individual motions.

2. A method of controlling a vehicle comprising the steps of, during motion of a vehicle under control of control signals:

transmitting a stopping setpoint of the vehicle as the control signals, which stopping setpoint corresponds to the desired stopping pose;

computing a stopping criterion for the vehicle based on the stopping setpoint, which stopping criterion is the vehicle intersecting a geometrical element, which geometrical element extends for a non-zero distance in at least one dimension;

sensing a sensed pose of the vehicle when the vehicle meets the stopping criterion; and changing the control signals in response to the sensed pose of the vehicle, so that the vehicle moves to the desired stopping pose.

3. The method of controlling a vehicle as recited in claim 2, wherein the steps of computing the stopping criterion based on the stopping setpoint and sensing when the vehicle meets the stopping criterion comprise the further steps of measuring a distance between a first pose of the vehicle and a second pose of the vehicle which has a known spacing from the desired stopped pose; and determining when a distance travelled by the vehicle from the first pose is at least equal to the measured distance between the first pose and the second pose.

4. The method of controlling a vehicle as recited in claim 2, wherein computing the stopping criterion includes finding a stopline running through the pose of the vehicle corresponding to the stopping setpoint and perpendicular to an orientation of the vehicle corresponding to the stopping setpoint.

5. The method of controlling a vehicle as recited in claim 2 wherein computing the stopping criterion includes setting a sensed parameter to a fixed value. criterion is met.

6. The method of controlling a vehicle as recited in claim 2, wherein computing the stopping criterion includes setting ranges of sensed parameters, which ranges define a bounding box around the pose of the vehicle corresponding to the stopping setpoint.

7. The method of controlling a vehicle as recited in claim 2 wherein sensing when the vehicle meets the stopping criterion includes monitoring a distance between a current pose of the vehicle and a pose corresponding to the stopping setpoint; and determining that the stopping criterion is met when the distance begins to increase.

8. The method of controlling a vehicle as recited in claim 2 wherein the vehicle is a farm tractor.

9. The method of controlling a vehicle as recited in claim 2 wherein the vehicle is earth-moving equipment.

10. The method of controlling a vehicle as recited in claim 2 wherein the vehicle is a boat.

11. The method of claim 2 wherein the vehicle is non-holonomic, and further comprising maintaining a representation of the vehicle which takes into account the vehicle's non-holonomic nature and using the representation in at least one of the determining, computing, sensing, and transmitting steps.

12. A method of controlling a vehicle for automatic error recovery comprising the following steps, during motion of the vehicle under control of control signals:

maintaining a stored configuration space representation of an environment of the vehicle, which representation includes a plurality of states and a direction arrow value for each state, the direction arrow values pointing to a desired goal;

sensing a parameter of the vehicle;

setting limits defining an acceptable range of error in the sensed parameter of the vehicle;

monitoring the error;

if the error exceeds the limits, revising an estimation of a current state of the vehicle in the configuration space representation and transmitting a changed control signal based on the revised estimation.

13. The method of controlling a vehicle for automatic recovery as recited in claim 12, wherein monitoring the error includes comparing a current pose of the vehicle with the limits as the vehicle progresses to a pose corresponding to a setpoint.

14. The method of controlling a vehicle for automatic recovery as recited in claim 12, wherein monitoring the error includes determining whether a stopping criterion is met; and comparing a current pose of the vehicle with the limits when the stopping criterion is met.

15. The method of controlling a vehicle for automatic recovery as recited in claim 12, wherein setting limits defining an acceptable range of error in a parameter includes determining if a kinematically feasible motion of the vehicle leads from a current pose of the vehicle to a target pose of the vehicle.

* * * * *